United States Patent
Huang

(10) Patent No.: US 8,121,532 B2
(45) Date of Patent: Feb. 21, 2012

(54) RADIO FREQUENCY IDENTIFICATION TAG AND OPERATING METHOD THEREOF

(75) Inventor: Chih-Hua Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 456 days.

(21) Appl. No.: 12/404,893

(22) Filed: Mar. 16, 2009

(65) Prior Publication Data

US 2009/0258592 A1 Oct. 15, 2009

(30) Foreign Application Priority Data

Apr. 9, 2008 (TW) ................................ 97112807 A

(51) Int. Cl.
*H04K 3/00* (2006.01)
(52) U.S. Cl. ............................ 455/1; 340/10.1; 340/10.2
(58) Field of Classification Search .................. None
See application file for complete search history.

(56) References Cited

U.S. PATENT DOCUMENTS

| 7,088,248 B2 * | 8/2006 | Forster ....................... 340/572.7 |
| 7,202,784 B1 * | 4/2007 | Herwig ....................... 340/568.1 |
| 7,283,044 B2 * | 10/2007 | Bandy ............................ 340/505 |
| 2007/0075145 A1 | 4/2007 | Arendonk |
| 2009/0036082 A1 * | 2/2009 | Sajid et al. ..................... 455/296 |
| 2010/0148964 A1 * | 6/2010 | Broer ......................... 340/572.1 |

OTHER PUBLICATIONS

TW patent OA, Jul. 11, 2011.

* cited by examiner

*Primary Examiner* — Tuan T Lam
(74) *Attorney, Agent, or Firm* — WPAT, P.C.; Justin King

(57) ABSTRACT

The invention provides a radio frequency identification (RFID) tag. The RFID tag includes a receiving module, a judging module, and a jamming module. The judging module includes a first judging unit and a second judging unit. When a jamming function of the RFID tag is activated, the first judging unit judges whether a request signal received by the receiving module contains a reading command. If a judgment result of the judging module is positive, the second judging unit then judges whether an authorization code of the reading command is valid. If either the judgment result of the first judging unit or the second judging unit is negative, the judging module controls the jamming module to generate a radio frequency (RF) jamming signal.

19 Claims, 4 Drawing Sheets

RADIO FREQUENCY IDENTIFICATION TAG AND OPERATING METHOD THEREOF

CROSS REFERENCE TO RELATED PATENT APPLICATION

This patent application is based on a Taiwan, R.O.C. patent application No. 097112807 filed on Apr. 9, 2008.

FIELD OF THE INVENTION

The present invention relates to radio frequency identification (RFID), and more particularly, to an RFID tag capable of generating a radio frequency (RF) jamming signal, and an operating method thereof.

BACKGROUND OF THE INVENTION

In a general wireless system, the presence of a jammer interferes with normal operations of the wireless system. However, under certain circumstances, a jammer is needed for its practical values. For example, a jammer implemented to a mobile communication system transmits a jamming signal that fails all nearby mobile systems from normal operations. Therefore, by achieving an effect of preventing disturbances from mobile phone noises, the jammer is suitable for environments where absolute quietness is needed.

A common RFID jammer is considered as a rather special jammer. Within a predetermined frequency range, an RFID jammer continuously scans and generates jamming signals, such that all RFID tags located within coverage of the radio frequency signals from the RFID jammer cannot be read in order to protect the RFID tags. In this situation, even authorized RFID readers are unable to communicate with the RFID tags. In fact, such destructive interference caused by RFID jammers frequently brings application inconvenience.

Therefore, it is one of the objectives of the invention to provide an RFID tag capable of generating an RF jamming signal, and an operating method thereof, to overcome the foregoing drawback.

SUMMARY OF THE INVENTION

According to an embodiment of the present invention, a radio frequency identification (RFID) tag capable of generating an RF jamming signal is disclosed. The RFID tag comprises an RFID response module, a judging module, a jamming module, and an antenna. The RFID response module comprises a transmitting/receiving module, a control module, and a memory. The judging module comprises a first judging unit and a second judging unit.

A signal is first received by the transmitting/receiving module, and transmitted to the judging module after being decoded by the control module. When a jamming function of the RFID tag is activated, the first judging unit judges whether the signal contains a reading command. If a judgment result of the judging module is positive, the second judging unit judges whether an authorization code of the reading command is valid. If the judgment result of either the first judging unit or the second judging unit is negative, the judging module will control the jamming module to generate an RF jamming signal.

According to an embodiment of the present invention, an operating method of an RFID tag is disclosed. The operating method comprises steps of: a) receiving a signal; b) judging whether the signal contains a reading command when a jamming function of the RFID is launched; c) judging an authorization code of the reading command is valid if a judgment result of step (b) is positive; and d) generating an RF jamming signal if the judgment of step (b) or step (c) is negative.

According to another embodiment of the present invention, an RFID tag is disclosed. The RFID tag comprises an antenna, an RFID response module, a jamming module and a judging module. The judging module is coupled to the RFID response module and the jamming module. According to a signal received by the antenna, the judging module determines whether to control the jamming module to generate an RF jamming signal.

According to the invention, when a jamming function of the RFID tag is activated, the RFID tag generates an RF jamming signal to prevent all RFID tags located within coverage of the jamming signal from being read by unauthorized readers. Thus, information stored in the RFID tags is fully protected. Compared to the prior art, the RFID tag and the operation method according to the current invention significantly reduce costs and storage space of additional RFID jammers. When the jamming function is inactive, the RFID tag according to the current invention is the same as any other RFID tag. Therefore, the RFID tag according to the current invention only passively generates a jamming signal, and is free from the drawback of having destructive interference as the conventional RFID jammer.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
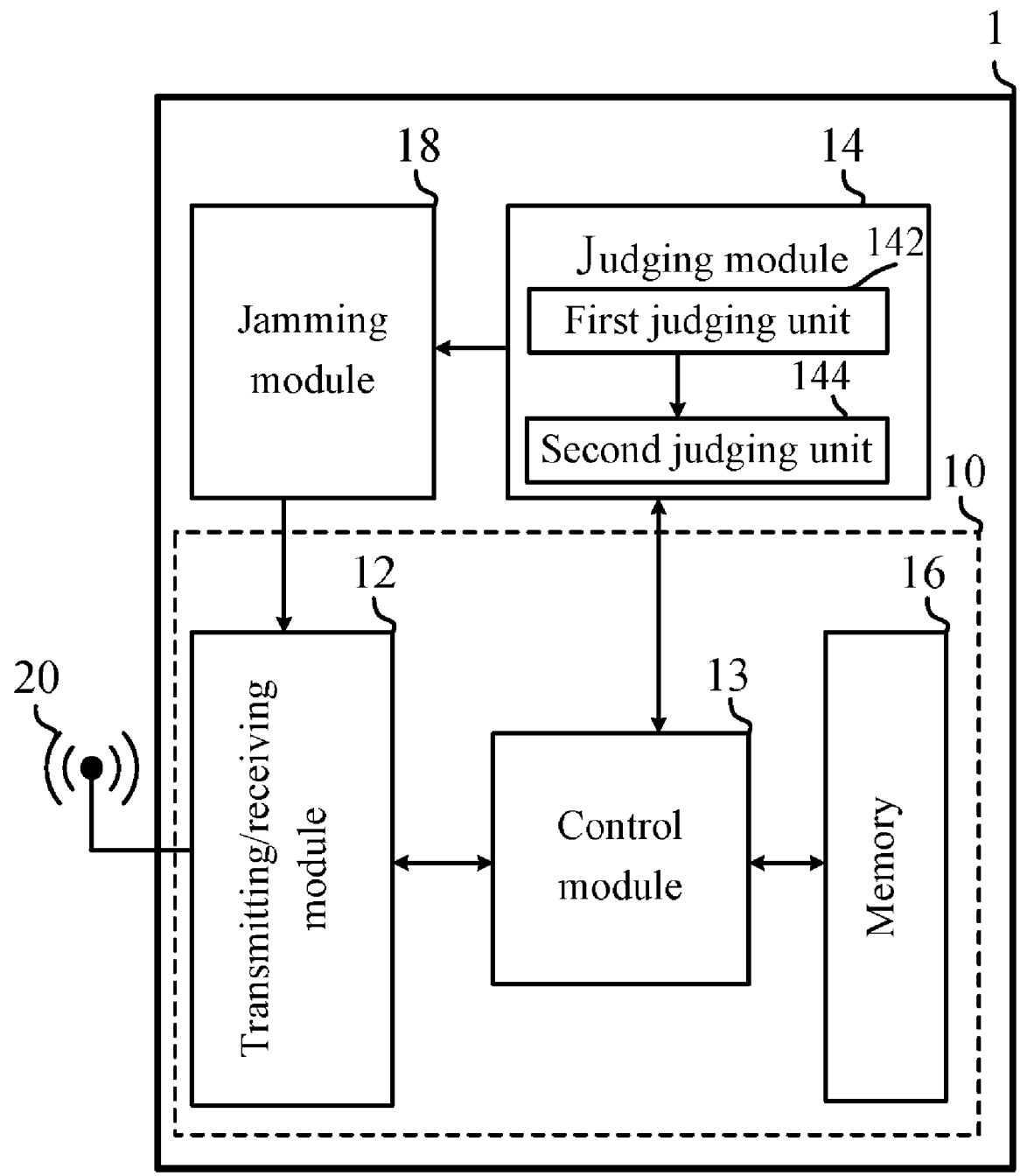
FIG. 1 is a functional block diagram of an RFID tag according to a first embodiment of the invention.

According to a first embodiment of the invention, a radio frequency identification (RFID) tag is disclosed. The RFID tag is capable of generating a jamming signal, which generates noises within a certain frequency band to interfere data transmission in that frequency band. FIG. 1 shows a functional block diagram of an RFID tag 1. The RFID tag 1 comprises an RFID response module 10, a judging module 14, a jamming module 18, and an antenna 20. The RFID response module 10 comprises a transmitting/receiving module 12, a control module 13, and a memory 16. The judging module 14 comprises a first judging unit 142 and a second judging unit 144. The transmitting/receiving module 12 is coupled to the antenna 20.

The transmitting/receiving module 12 is for transmitting and receiving a signal. In actual practice, a request signal received by the transmitting/receiving module 12 may be an RF signal transmitted by an RFID reader. When received by transmitting/receiving module 12, the request signal is transmitted to the control module 13, which then decodes the request signal to generate a command signal.

The control module 13 activates or shuts down the jamming function of the RFID tag 1 by modifying a control value of a jamming activating variable stored in the memory 16. The control value of the jamming activating variable may be set by an RFID reader.

When the jamming function of the RFID tag 1 is activated, all RFID readers become unable to read the RFID tag 1 and other nearby RFID tags. Hence, when the RFID reader is to shut down the jamming function of the RFID tag 1, the RFID reader first needs to send out a reading command, so that the RFID tag 1 with activated jamming function temporarily allows to be read by the RFID reader. The reading command is contained in the request signal or in the command signal.

For example, the reading command sent out by the RFID reader may have the following format:

CMD={JAMMER, auth_code}

In the above reading command, the parameter "JAMMER" is a command for temporarily removing the jamming. The parameter "auth_code" is an authorization code. Provided the command for removing the jamming (the parameter "JAMMING") is effective and the authorization code (the parameter "auth_code") is judged to be valid, the RFID tag 1 shall only temporarily allow reading by the RFID reader. It is to be noted that, the reading command does not affect the control value of the jamming activating variable but only temporarily allows reading by the RFID reader.

As discussed, when the jamming function of the RFID tag 1 is shut down by the control value of the jamming activating variable set by the control module 13, the RFID tag 1 acts the same as a common RFID tag. Specifically, the RFID tag 1 generates a response signal according to the received request signal (command signal). When the jamming function of the RFID tag 1 is activated by the control value of the jamming activating variable set by the control module 13, the first judging unit 142 of the judging module 14 judges whether the request signal contains the reading command.

There are two possible judgment results by the first judging unit 142. When the judgment result of the first judging unit 142 is negative, it means that the request signal does not contain the reading command, and the judging module 14 then controls the jamming module 18 to generate an RF jamming signal. At this point, the RFID tag 1 functions as an RFID jammer, and hence the RFID reader is unable to read the RFID tag 1 and all other nearby RFID tags. When the judgment result of the first judging unit 142 is positive, it means the request signal contains the reading command, and the second judging unit 144 subsequently judges whether an authorization code contained in the reading command is valid.

There are two possible judgment results by the second judging unit 144. When the judgment result of the second judging unit 144 is negative, it means the authorization code of the reading command is invalid, and the judging module 14 controls the jamming module 18 to generate an RF jamming signal. When the judgment result of the second judging unit 144 is positive, it means the authorization code of the reading command is valid. At this point, the judging module 14 controls the jamming module 18 to temporarily stop transmitting the RF jamming signal so that the RFID reader is permitted to read the RFID tag 1.

Accordingly, when the judgment result of the first judging unit 142 or the second judging unit 144 is negative, the judging module 14 controls the jamming module 18 to generate the RF jamming signal so that the RFID reader becomes unable to read the RFID tag 1.

As shown in FIG. 1, the transmitting/receiving module 12, coupled to the jamming module 18, is for transmitting the RF jamming signal generated by the jamming module 18 to a predetermined range around the RFID tag 1. In actual practice, the predetermined range may be a few centimeters or a few meters, depending on the nature of the RFID tag 1. Whereby, using the RF jamming signal, all RFID tags located within the coverage of the RF jamming signal are protected from being read by unauthorized reading devices.

Figure 2:
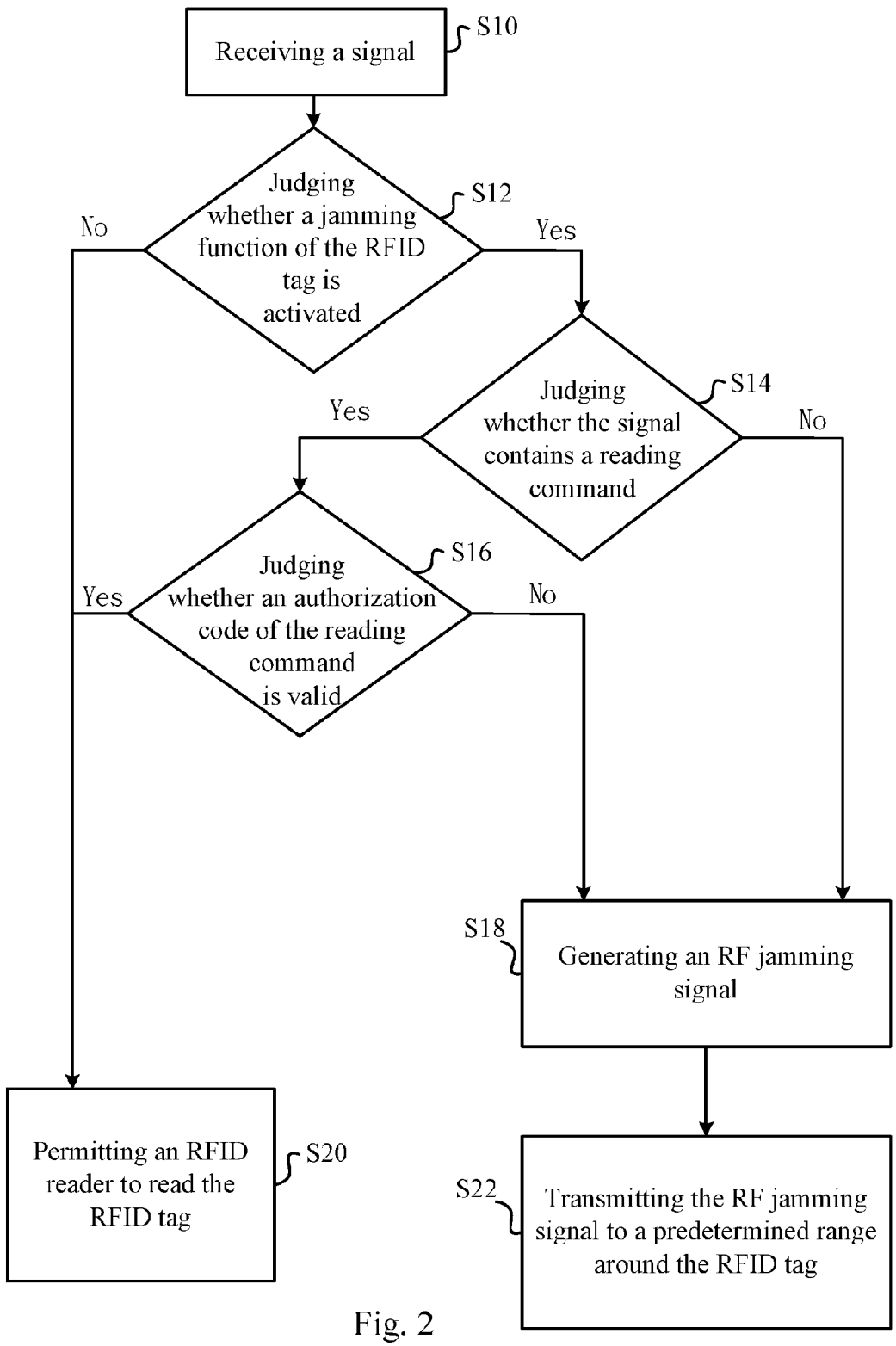
FIG. 2 is a flowchart of an operating method according to a second embodiment of the invention.

According to a second embodiment of the invention, an RFID operating method is disclosed. The operating method enables an RFID tag to generate an RF jamming signal. Refer to FIG. 2 showing a flowchart of the RFID operating method.

With reference to FIG. 2, the method starts at Step S10 by receiving a request signal. In actual practice, the request signal may be an RF signal transmitted from an RFID reader. In subsequent Step S12, a jamming function of the RFID tag is judged whether it is activated.

In Step S12, there are two possible judgment results. When the judgment result in Step S12 is negative, it means the jamming function is inactive, and the RFID reader is permitted to read the RFID tag as in Step S20. When the judgment result in Step S12 is positive, it means the jamming function is activated, and the request signal is then judged whether it contains a reading command as in Step S 14.

In Step S14, there are two possible judgment results. When the judgment result in Step S14 is negative, it means the request signal does not contain the reading command, and the RF jamming signal is generated as in Step S18. When the judgment result in Step S14 is positive, it means the request signal contains the reading command, and an authorization code of the reading command is judged whether it is valid as in Step S16.

In Step S16, there are two possible judgment results. When the judgment result in Step S16 is negative, it means the authorization code is invalid, and the RF jamming signal is generated as in Step S18. When the judgment result in Step S16 is positive, it means the authorization code is valid, and the RFID reader is permitted to read the RFID tag as in Step S20.

In actual practice, after Step S18 of generating the RF jamming signal, the RF jamming signal is transmitted to a predetermined range around the RFID tag as in Step S22. Whereby, using the RF jamming signal, all RFID tags located within the coverage of the RF jamming signal are protected from being read by unauthorized reading devices.

Figure 3A:
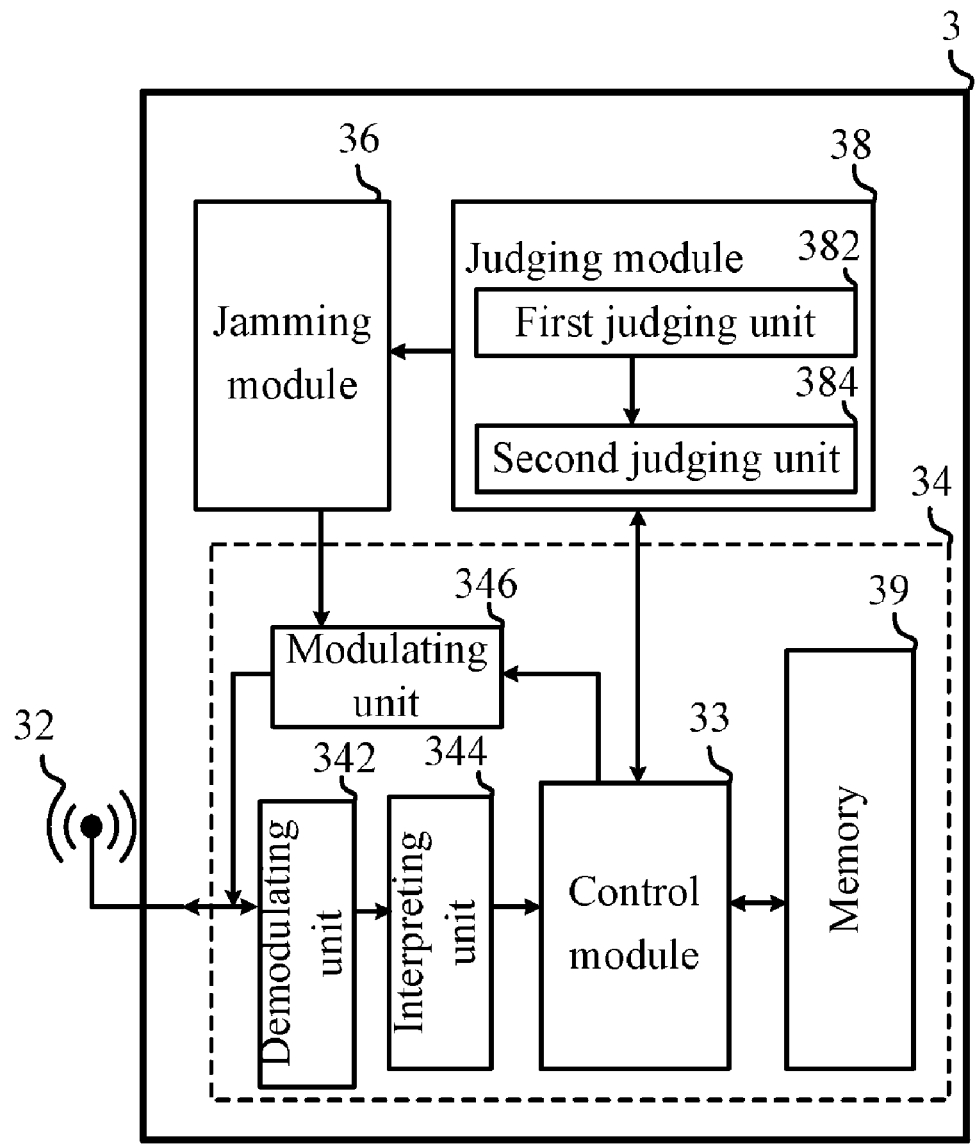
FIGS. 3A and 3B are functional block diagrams of an RFID tag according to a third embodiment of the invention.
Figure 3B:
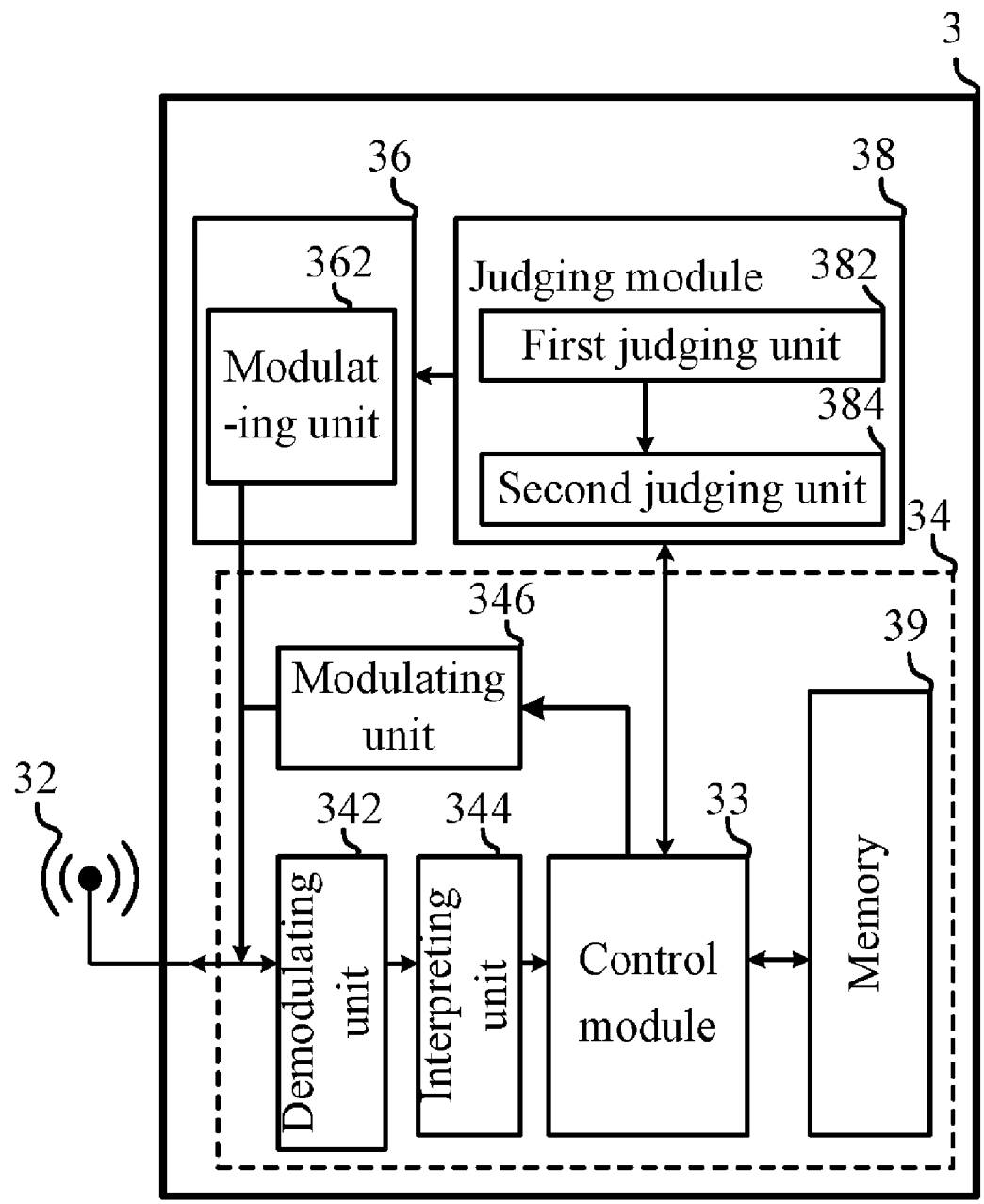

According to a third embodiment of the invention, an RFID tag is disclosed. The RFID tag is capable of generating an RF jamming signal. FIGS. 3A and 3B show functional block diagrams of a RFID tag 3. The RFID tag 3 comprises an antenna 32, an RFID response module 34, a jamming module 36, and a judging module 38. The RFID response module 34 comprises a demodulating unit 342, an interpreting unit 344, a modulating unit 346, a control module 33, and a memory 39. The judging module 38 comprises a first judging unit 382 and a second judging unit 384. The demodulating unit 342 and the modulating unit 346 are coupled to the antenna 32. The judging module 38 is coupled to the control module 33 and the jamming module 36.

The antenna 32 is for transmitting a signal and receiving a request signal, which may come from an RFID reader. The demodulating unit 342 is coupled to the antenna 32, and is for generating a demodulated signal by demodulating the received request signal. The interpreting unit 344 is coupled to the demodulating unit 342, and is for interpreting the demodulated signal generated by the demodulating unit 342 to generate a command signal to be transmitted to the control module 33.

The control module 33 modifies a control value of a jamming activating variable stored in the memory 39, which activates or shuts down the jamming function of the RFID tag 3. The control value of the jamming activating variable may be set via an RFID reader.

When the control value of the jamming activating variable is set as shut down, the RFID tag 3 functions as a common RFID tag. Specifically, the RFID tag 3 generates a response signal according to a command of a received request signal (command signal) via the antenna 32, whereby the RFID reader is permitted to read the RFID tag. However, when the control value of the jamming activating variable is set as activated, it means the jamming function of the RFID tag 3 is activated, and the RFID tag 3 generates an RF jamming signal or a response signal according to the request signal (command signal), as to be described below.

When the jamming function of the RFID tag 3 is activated, the first judging unit 382 of the judging module 38 judges whether the request signal (command signal) contains a reading command upon receiving the request signal (command signal). There are two possible judgment results by the first judging unit 382. When the judgment result is negative, it means the request signal (command signal) does not contain the reading command, and the judging module 38 controls the jamming module 36 to generate an RF jamming signal. That is, the jamming module 36 generates an RF jamming signal in response to the request signal (command signal), so that the RFID reader becomes unable to read the RFID tag 3 and all other nearby RFID tags. When the judgment result of the first judging unit 382 is positive, it means the request signal (command signal) contains the reading command, and the second judging unit 384 subsequently judges whether an authorization code contained in the reading command is valid.

There are two possible judgment results by the second judging unit 384. When the judgment result of the second judging unit 384 is negative, it means that the authorization code of the reading command is invalid, and the judging module 38 then controls the jamming module 36 to generate the RF jamming signal. At this point, the jamming module correspondingly generates the RF jamming signal. The jamming RF jamming signal is transmitted to a predetermined range around the RFID tag 3 via the antenna 32, so that the RFID reader becomes unable to read the RFID tag 3 and other RFID tags located within the predetermined range.

When the judgment result of the second judging unit 384 is positive, it means the authorization code of the reading command is valid. At this point, the judging module 38 is not activated, and the RFID response module 34 generates a response signal in response to the received request signal (command signal) that the RFID reader is permitted to read the RFID tag 3. Specifically, the RFID tag functions as a common RFID tag. It is to be noted that the aforesaid reading command does not affect the control value of the jamming activating variable.

As shown in FIG. 3A, the modulating unit 346 of the RFID response module 34 is coupled to the antenna 32, the control module 33 and the jamming module 36. In this embodiment, the jamming module 36 and the RFID response module 34 share the modulating unit 346. That is, the RF jamming signal generated by the jamming module 36 or the response signal generated by the control module 33 are both modulated by the modulating unit 346 and then transmitted via the antenna 32.

In actual practice, in addition to the modulating unit 346 contained in the response module 34, the jamming module 36 may also comprise a separate modulating unit 362. As shown in FIG. 3B, the RF jamming signal generated by jamming module 36 is modulated by the modulating unit 362 and then transmitted via the antenna 32. The response signal generated by the RF response module 34 is, as previously discussed, modulated by the modulating unit 346 and then transmitted via the antenna 32.

The RFID tag 3 may further comprise a power regulating module (not shown), for supplying power for normal operations of the modules or components of the RFID tag 3. Whether the power supply is external or internal is dependent on the nature of the RFID tag 3. If the RFID tag 3 is an active RFID tag, the RFID tag 3 itself comprises a power supply. If the RFID tag is a passive RFID tag, the RFID tag 3 does not comprise a power supply but acquires power by converting the signal received from the RFID reader.

Therefore, according to the present invention, the RFID tag disclosed is capable of generating an RF jamming signal for preventing all RFID tags located within the coverage of the jamming signal from being read by unauthorized readers, whereby information stored in the RFID tags is fully protected. Compared to the prior art, the RFID tag according to the invention, passively generating the jamming signal, is free from the drawback of having destruction interference. Further, the RFID tag according to the invention is capable of detecting whether attempts to read the RFID tag according to the invention or other nearby RFID tags are made by illegal RFID readers. In the event that illegal reading attempts are detected, the RFID tag according to the invention transmits the jamming signal to protect itself or surrounding RFID tags.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A radio frequency identification (RFID) tag, comprising:
   a receiving module, for receiving a request signal;
   a judging module, comprising:
      a first judging unit, coupled to the receiving module, for providing a first judgment result whether the request signal contains a reading command when a jamming function of the RFID tag is activated; and
      a second judging unit, coupled to the first judging unit, for providing a second judgment result whether an authorization code of the reading command is valid when the first judgment result of the first judging unit is positive; and
   a jamming module, coupled to the judging module;
   wherein, the judging module controls the jamming module to generate an RF jamming signal when either the first judgment result of the first judging unit or the second judgment result of the second judging unit is negative.

2. The RFID tag as claimed in claim 1, wherein the request signal is received from an RFID reader.

3. The RFID tag as claimed in claim 2, the judging module permits the RFID reader to read the RFID tag when either the jamming function is inactive or the second judgment result of the second judging unit is positive.

4. The RFID tag as claimed in claim 2, the judging module declines the RFID reader from reading the RFID tag when either the first judgment result of the first judging unit or the second judgment result of the second judging unit is negative.

5. The RFID tag as claimed in claim 1, further comprising:
   a transmitting module, coupled to the jamming module, for transmitting the RF jamming signal within a predetermined range around the RFID tag.

6. The RFID tag as claimed in claim 1, further comprising:
a memory, coupled to the judging module, and stored with a jamming activating variable associated with the jamming function.

7. A method for operating an RFID tag, comprising steps of:
a) receiving a request signal;
b) judging whether the request signal contains a reading command when a jamming function of the RFID tag is activated;
c) judging whether an authorization code of the reading command is valid when a judgment result of step (b) is positive; and
d) generating an RF jamming signal when either step (b) or step (c) returns negative.

8. The method as claimed in claim 7, wherein the request signal is received from an RFID reader.

9. The method as claimed in claim 8, further comprising a step of:
(e) permitting the RFID reader to read the RFID tag when either the jamming function is inactive or when the step (c) returns positive.

10. The method as claimed in claim 8, further comprising a step of:
(f) declining the RFID reader from reading the RFID tag when the judgment result of step (b) or step (c) is negative.

11. The method as claimed in claim 7, further comprising a step of:
(g) transmitting the RF jamming signal to within predetermined range around the RFID tag.

12. The method as claimed in claim 7, wherein the RFID tag comprises a memory stored with a jamming activating variable associated with the jamming function.

13. An RFID tag, comprising:
an antenna, for receiving a request signal;
an RFID response module, coupled to the antenna;
a jamming module; and
a judging module, coupled to the RFID response module and the jamming module, for determining whether to control the jamming module to generate an RF jamming signal according to the request signal, comprising
a first judging unit, providing a first judgment result on whether the request signal contains a reading command when a jamming function of the RFID tag is activated; and
a second judging unit, providing a second judgment result on whether an authorization code of the reading command is valid when the first judgment result of the first judging unit is positive.

14. The RFID tag as claimed in claim 13, wherein the RFID response module generates a response signal in response to the request signal when the judging module does not control the jamming module to generate the RF jamming signal.

15. The RFID tag as claimed in claim 14, wherein the request signal is received from an RFID reader.

16. The RFID tag as claimed in claim 13, wherein the RFID response module generates a response signal in response to the request signal when the second judgment result of the second judging unit is positive.

17. The RFID tag as claimed in claim 13, wherein the judging module controls the jamming module to generate the RF jamming signal when either the first judgment result of the first judging unit or the second judgment result of the second judging unit is negative.

18. The RFID tag as claimed in claim 13, wherein the RFID response module comprises:
a memory, stored with a jamming activating variable associated with whether a jamming function of the RFID tag is activated.

19. The RFID tag as claimed in claim 13, wherein the RFID response module comprises:
a demodulating unit, coupled to the antenna, for demodulating the request signal into a demodulated signal; and
an interpreting unit, couple to the demodulating unit and the judging module, for interpreting the demodulated signal to generate a command signal;
wherein, according to the command signal, the judging module judges whether to control the jamming module to generate the RF jamming signal.

* * * * *